United States Patent
Caruso et al.

(10) Patent No.: US 8,223,353 B2
(45) Date of Patent: Jul. 17, 2012

(54) MULTIPLE PROCESSOR PRINT DRIVER

(75) Inventors: Angelo Caruso, Marion, NY (US);
James F. Herrmann, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 13/356,972

(22) Filed: Jan. 24, 2012

(65) Prior Publication Data

US 2012/0120434 A1    May 17, 2012

Related U.S. Application Data

(62) Division of application No. 12/052,235, filed on Mar. 20, 2008, now Pat. No. 8,130,400.

(51) Int. Cl.
*G06F 3/12* (2006.01)
*G06K 15/00* (2006.01)

(52) U.S. Cl. ............ 358/1.13; 358/1.15; 358/1.17; 358/1.18

(58) Field of Classification Search .......... None
See application file for complete search history.

(56) References Cited

U.S. PATENT DOCUMENTS

| | | | |
|---|---|---|---|
| 4,752,894 A | 6/1988 | Deering et al. | |
| 5,179,637 A | 1/1993 | Nardozzi | |
| 5,724,591 A | 3/1998 | Hara et al. | |
| 5,729,665 A | 3/1998 | Gauthier | |
| 5,923,678 A | 7/1999 | Ishibashi | |
| 6,433,885 B1 | 8/2002 | Verghese et al. | |
| 6,532,016 B1 | 3/2003 | Venkateswar et al. | |
| 7,102,768 B2 | 9/2006 | Daly et al. | |
| 7,158,254 B2 | 1/2007 | Ferlitsch | |
| 2004/0114170 A1 | 6/2004 | Christiansen et al. | |
| 2004/0196483 A1 | 10/2004 | Jacobsen | |
| 2004/0196498 A1 | 10/2004 | Klassen | |
| 2006/0274355 A1 | 12/2006 | Ferlitsch | |

OTHER PUBLICATIONS

Josef Kohout, Selected Problems of Parallel Computer Graphics:, Technical Report No. DCSE/RT-2004-02, Mar. 2004, University of West Bohemia in Pilsen Department of Computer Science and Engineering [retrieved Jun. 14, 2009] Restrieved from the Internet. <URL: http://beta.kiv.zcu.cz/vyzkum/publikace/technicke-zpravy/2004/tr-2004-02.pdf>, p. 20, Para 3, and Fig. 3.7 (a)-(c).

*Primary Examiner* — Dov Popovici
(74) *Attorney, Agent, or Firm* — Roland R. Schindler, II

(57) ABSTRACT

A system and method for an adaptable print driver that adapts its behavior to make use of multiple processors when they are available on the host computer. In particular, during installation or initialization of the print driver, the driver will query the operating system for the number and type of processors present. If the print driver detects that multiple processors are present, it will operate in a way that makes explicit use of the multiple processors.

3 Claims, 5 Drawing Sheets

MULTIPLE PROCESSOR PRINT DRIVER

CROSS-REFERENCE TO RELATED APPLICATIONS

This application is a Divisional application of U.S. patent application Ser. No. 12/052,235, filed on Mar. 20, 2008, now U.S. Pat. No. 8,130,400 which is incorporated herein by reference in its entirety.

FIELD OF THE INVENTION

The present invention relates generally to printing and more specifically to adaptive Print Driver software that has the ability to detect the number of processors present on the host computer on which it is installed and make full use of the processing power available to maximize printing throughput.

BACKGROUND OF THE INVENTION

It is typical of the printing architectures in modern operating systems such as Microsoft Windows, Mac OS, and now Linux to make use of Print Drivers. Print Drivers are responsible for converting the PC/workstation Operating System Graphical User Interface (GUI) Application programming interface (API) calls issued by various applications to a data format suitable for consumption by a printer. Typically the print driver converts the data into either a Page Description Language, such as Printer Command Language (PCL) which is a Page description language (PDL) developed as a printer protocol and has become a de facto industry standard or PostScript, or directly to a proprietary print-ready compressed raster format. It has historically been the case that Print Drivers are designed to function in a single-threaded manner and operate in the background, utilizing spare processing power to process pending print jobs. However, faster print engine speeds, higher printer resolutions and ever more complex documents, such as compound documents incorporating images, text, and graphics make it increasingly difficult for such Print Drivers to keep up with the print engine. Further, since print drivers were not developed with support for multiple processors in mind, they are simply not able to make use of extra processing power that is present on systems with multiple processors.

It has recently become common for PCs used in typical office environments to include multiple general-purpose processors sharing common memory resources (e.g. a Symmetric Multiprocessing architecture), and this trend is likely to continue, with the number of processors available on new systems increasing over time. In a typical office use scenario the processors on any given machine are not heavily loaded. Users often spend a majority of their time viewing and editing documents created with common office applications such as word processors, spreadsheets, and the like. In these scenarios the load on the processor(s) is minimal and processors may in fact be idle for much of the time. As the number of processors found on typical systems continues to increase, traditional single-threaded Print Drivers will be increasingly disadvantaged, as more and more processing power lies idle while pending print jobs are being processed.

Another related trend in personal computer (PC) hardware is the presence of more increasingly powerful graphics processing units used to render high quality graphics, such as High Definition video and computer generated graphics used in gaming and virtual reality applications, for display. These CPUs typically feature multiple texturing units, which are independent graphics rendering units that operate in parallel. Just as general purpose processing power may lie idle in typical office use scenarios, the load on GPU hardware is often far below the power available. Traditional print drivers have no means of accessing the spare rendering power of GPUs since they are single-threaded designs constrained to execute solely on general purpose system processors.

In addition to the trend toward multiprocessor systems with powerful graphics processing units, there are also new and alternative hardware architectures emerging that are inherently designed for parallel processing. One example is the Cell Broadband Engine, currently used in the Sony PlayStation 3 gaming machine. The current Cell architecture consists of one dual-threaded general-purpose processor interconnected with eight special-purpose processing elements. Each special purpose element is optimized for "single instruction multiple data" processing in an independent thread of execution. Traditional print driver designs have no means of utilizing the parallel processing power of the Cell, or any other inherently multi-threaded architecture.

Therefore, it is an object of the present invention to process print jobs in a multi-threaded manner, thus making explicit use of the multiple processors present on the host system, whether those processors are general or special purpose.

In the prior art, there are examples of methods that make use of multiple processors for the purpose of rasterizing portions of a page in parallel. In one such example, US2004/0196483, a print driver partitions a page description into a plurality of scan lines, and uses multiple processors to rasterize the scan lines in parallel. However, this method uses fine-grained parallelism (i.e. the scan line). Depending on the complexity and size of the print job, fine-grained parallelism may be suboptimal due to the overhead associated with excessive context switching. Thus, it is another object of the present invention to determine on a per job basis the optimal level of granularity to best utilize the multiple processing capability of the hardware.

Also in the prior art, it is common for both print drivers as well as RIPs to be architected as a pipeline of processing steps, with FIFOs between the various processing stages in the pipeline. U.S. Pat. No. 6,433,885 and U.S. Pat. No. 7,102,768 are two such examples in which a print driver pipeline is constructed from a plurality of processing stages. While these methods allow efficient operation in the presence of resource limitations at the ends of the respective pipelines, they are still inherently single-threaded and cannot take advantage of multiple processors. Thus, it is another object of the present invention to construct print driver processing pipelines using independent execution threads for at least two of the processing stages in order to make explicit use of multiple processors when they are available.

In still another example from the prior art, US20060274345, an adaptive print driver is disclosed that analyzes both the host computer processing capabilities as well as those of the printer RIP and determines the proportions of rendering that should be performed on the host in order to load balance for optimal throughput. However, this print driver is inherently single-threaded and will therefore allow processors to remain idle on a multiprocessor system. Further, it relies on communication with the printer to properly determine the proportion of rendering that should be performed on the host side. Thus, it is yet another object of the present invention to make full use of host computer processing capabilities through explicit use of parallel rendering, without regard to the capabilities of the printer RIP controller.

SUMMARY OF THE INVENTION

The present invention discloses a Print Driver that adapts its behavior to make use of multiple processors when they are available on the host computer. In particular, during installation or initialization of the print driver, the driver will query the operating system for the number and type of processors present. If the print driver detects that multiple processors are present, it will operate in a way that makes explicit use of the multiple processors.

In one embodiment, the print driver will determine an appropriate level of granularity for rendering of a particular print job using the processors present, and then partition the print job into independent work units based on that level of granularity. The work units will then be processed by independent threads of execution so that rendering of the work units occurs substantially in parallel. Once rendering of the work units is completed, the driver will reassemble the resulting data in the correct sequence before transferring the data to the printer.

In another embodiment of the present invention, when the print driver detects that multiple processors are present, then the various processing stages of the print driver may be implemented as independent threads of execution so that the processing stages operate substantially in parallel.

DETAILED DESCRIPTION OF THE INVENTION

Figure 1:
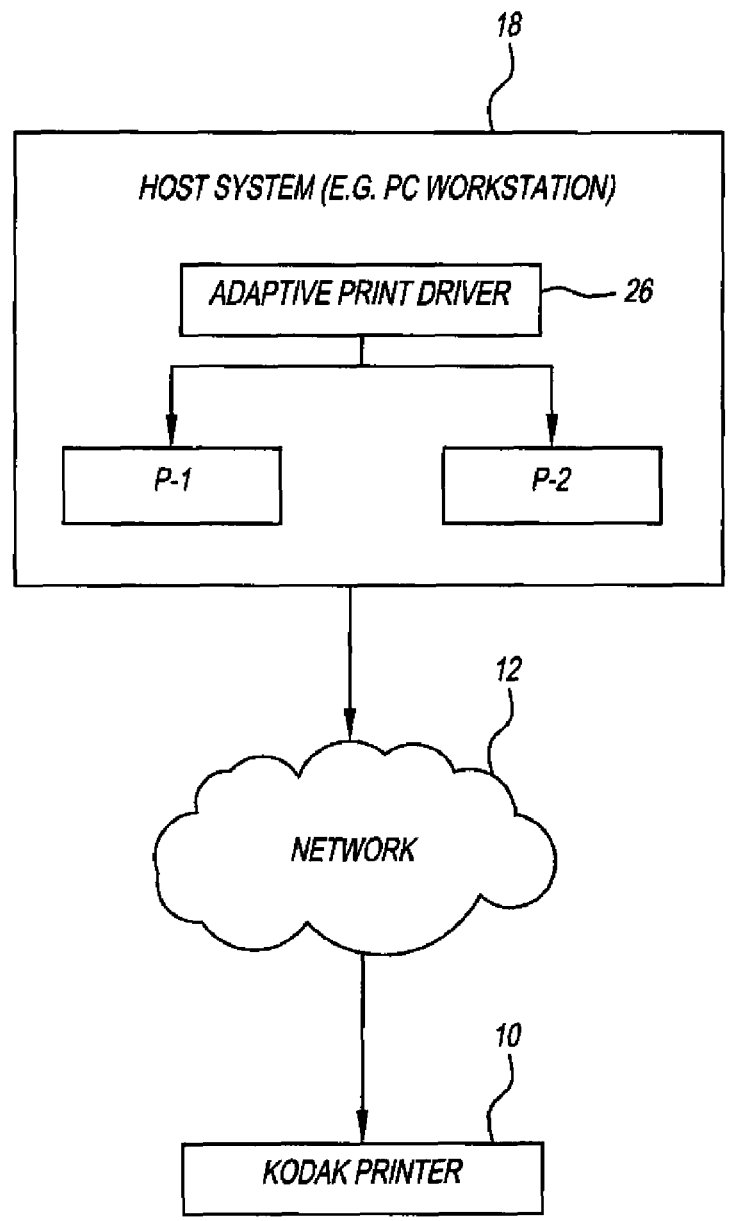
FIG. 1 is a schematic view of a typical network-printing environment including a multiprocessing host PC with adaptive print driver system according to this invention.

FIG. 1 illustrates a typically office printing environment that would include the adaptive print driver of the present invention. The adaptive nature of the print driver makes use of knowledge of the number and type of processors present on the host system to optimize its behavior and improve printing throughput. The adaptive print driver may be implemented on any one of a number of common operating systems found in typical office environments, such Microsoft Windows, Apple Mac OS, or Linux. Further, the print driver may make use of both general purpose and specialized processor elements present on the host system, and adjust its behavior accordingly.

Figure 2:
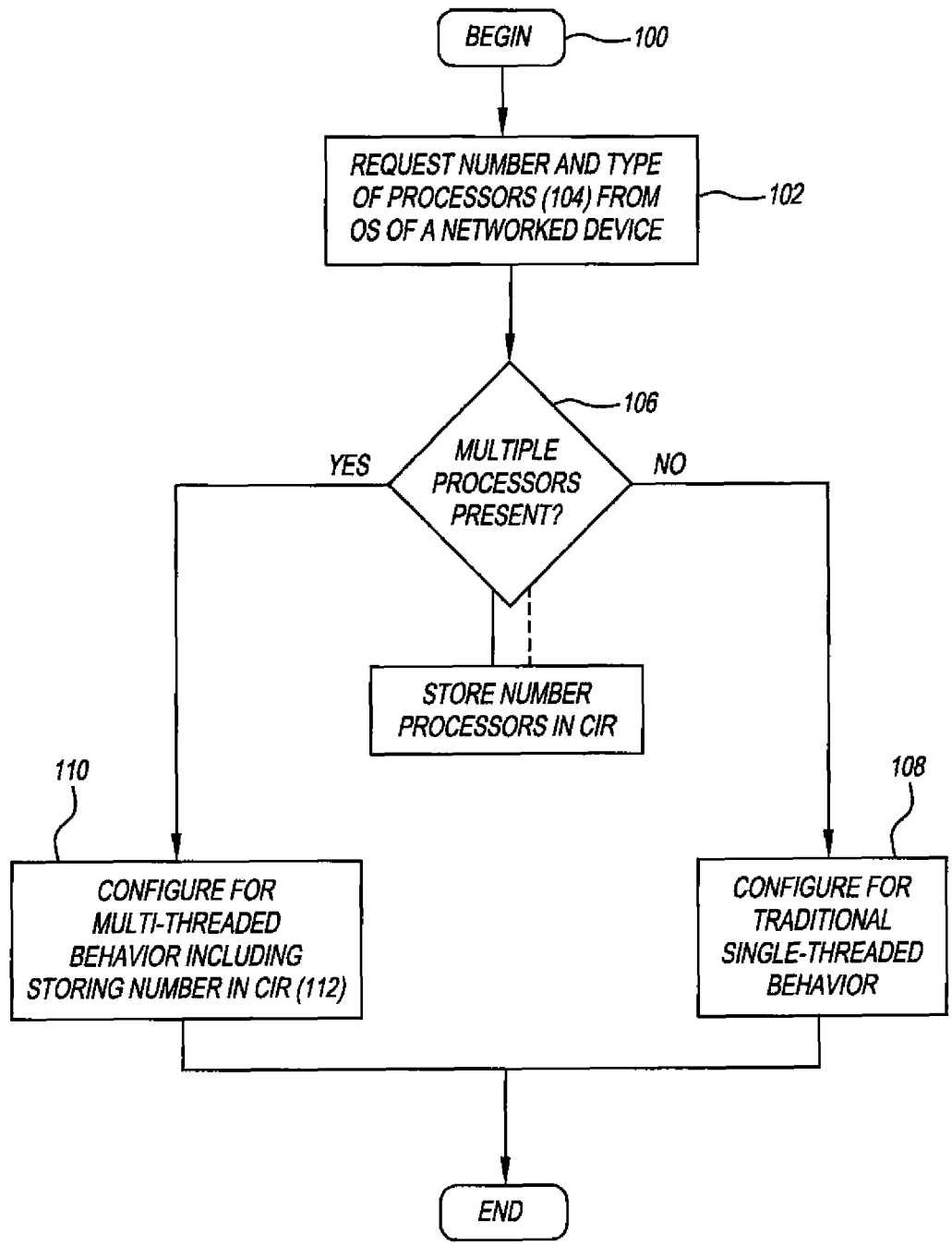
FIG. 2 shows the logical flow of the adaptive print driver at installation or initialization time.

The adaptive print driver of the present invention uses the plural parallel processors of the host system to accelerate the desired task of printing by dividing up said printing task into independent work units that are rendered in parallel. In the description below the use of a personal computer (PC) 18 acting as a host system having plural parallel processors is used to describe the present invention of an adaptive print driver 26. However, the host system may in fact be any device from which a user desires printed output. Such devices include a personal digital assistant (PDA), a cell phone, a document scanner, a personal computer (PC) or a server. FIG. 2 illustrates a portion of the method and related system for adaptive printing using plural parallel processors (P-1, P-2) to accelerate tasks, such as printing, by using the parallel processors to divide up the tasks. To begin 100 the system requests 102, by querying the host computer 12 to detect the number of processors, so that the print driver can adapt its behavior based on the number and type of processors 104 present on the host system 12. Each of the operating systems mentioned above has support for multiple processors and exposes to all installed applications and drivers an API that provides information about the number and type of processors present on the system. The details of the API used to request the processor information is known to those skilled in the art and will not be elaborated here. Sometime during the initialization of the print driver, which may occur during installation or at some later time before printing begins, the print driver makes one or more API calls to the underlying OS requesting the number and type of processors present. If the number of processors present 106 is one (1) 108, the print driver will proceed to behave in a manner similar to traditional single-threaded print drivers. The behavior of a traditional single-threaded print driver is well known to those skilled in the art and will not be described further here. If the number of processors present is two (2) or more 110, the print driver will proceed to behave in a multi-threaded manner in order to explicitly utilize the multiple processors present on the host system.

In the present invention, the print driver may access the configuration information record (CIR) maintained by the print driver and store the knowledge of the number and type of processors present in its configuration data 112, so that it need not repeatedly query the OS for the information, and it may also periodically refresh this information. In one preferred embodiment, the print driver will repeat the process described in FIG. 1 each time the print driver is initialized, which will typically occur after the time the host system is booted, but before printing begins. Thus, the print driver will always have accurate knowledge of the number and type of processors present.

Figure 3:
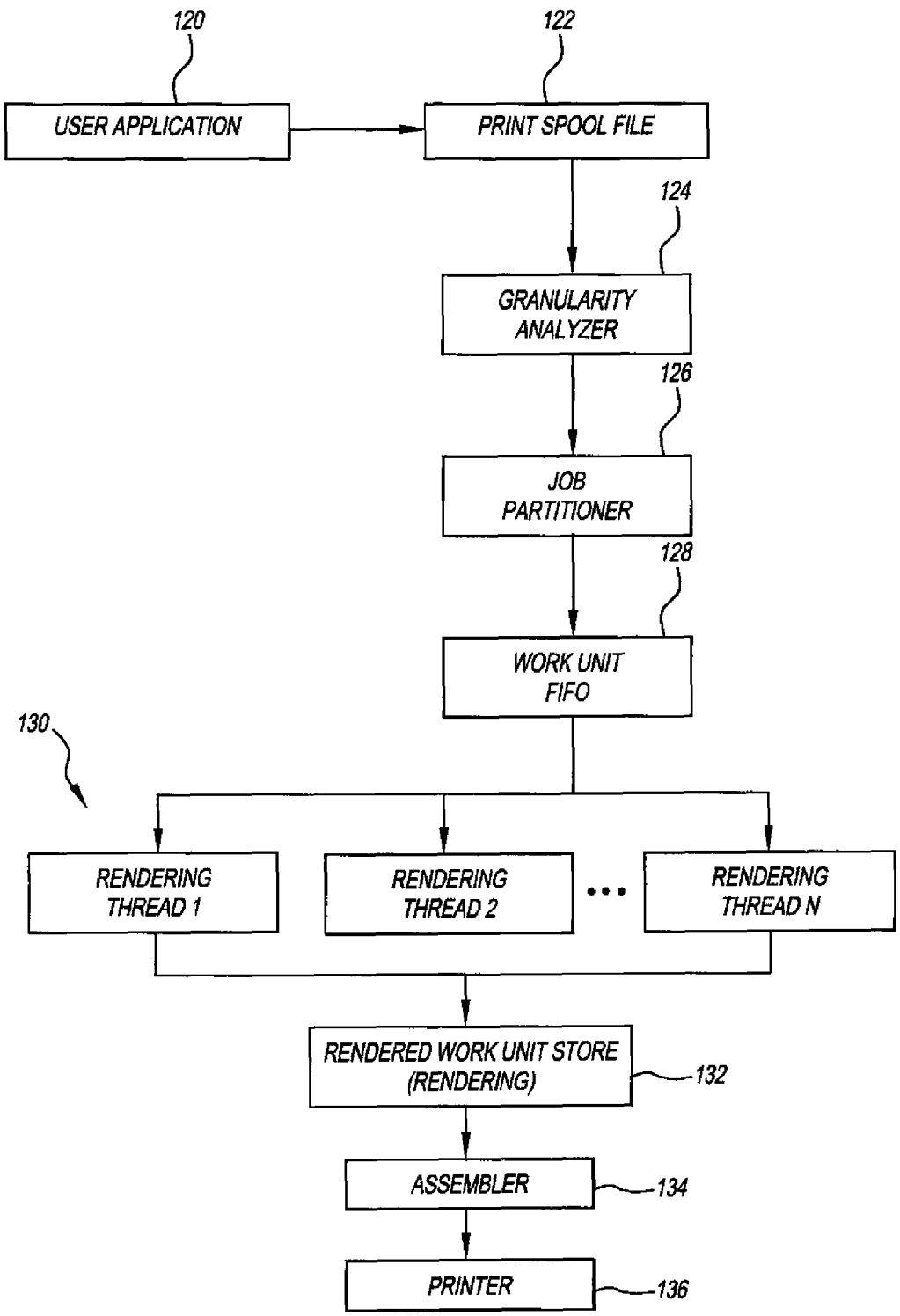
FIG. 3 shows the data flow of print job processing using multiple rendering threads in the above described adaptive print driver.

FIG. 3 provides a general illustration of the processing steps and data flow in the one preferred embodiment, when the adaptive print driver 26 has determined that multiple general-purpose processors are present. Print processing begins as it does with any print driver, with the user initiating a print job from a typical office application. The process of print job submission, from the users' point of view, is substantially the same as would be experienced with any traditional print driver, with a print dialog being presented to the user. The adaptive print driver in the present invention may display a print dialog, presenting the various printing options supported by the printer, just like a traditional print driver. The print dialog and selection of printing features by the user is well known in the art, and will not be further elaborated here. Once the user has made their feature selections and submitted the job for printing 120, the print data stream is transferred by the application to the print subsystem, where the print job data is then queued in a print spool file, or the like 122. The exact details of the print subsystem and print spool file are operating system specific, and will not be detailed here. Suffice is to say that the submitted print job consists of a sequence of commands and data describing the page images of the document to be printed. In the one preferred embodiment, the print job data sequence would be substantially equivalent to that known to those skilled in the art of printing and print drivers. For example, in the Microsoft Windows operating system the print job would consist of a sequence of Graphic Driver Interface (GDI) calls made by the application, which are stored in the spool file in the Electronic Media File (EMF) format. The print subsystem would then present the print job to the print driver by "replaying" the Electronic Media file (EMF) and making the Graphic Driver Interface (GDI) calls directly to the print driver. This example is for illustrative purposes only, and should not be construed to limit the scope of this invention in any way. The exact format of data in the print spool file may vary substantially yet remain completely compatible with the invention described here.

As illustrated in FIG. 3, the adaptive print driver 26 receives data from the print spool file and passes it to the granularity analyzer 124. The granularity analyzer 124 will determine, based on the characteristics of the print job, the number and type of processors present, and perhaps other factors, at what level of granularity the use of parallel rendering will yield the best printing throughput. For example, when the number of pages in the print job is on the order of, or greater than the approximate per-minute page speed of the printer, a page-level granularity is likely to produce the best overall throughput when using general purpose processors. Alternatively, when the job comprises fewer pages or when one or more of the pages are very complex, then a lower level of granularity is advantageous. For example, complex pages comprised of many distinct graphical objects may favor a granularity at the level of the graphical object. When there are many non-overlapping objects present an even lower level of granularity, such as a band or strip of several scan lines may be chosen. In still another example, when the system includes special purpose processors such graphics processor texturing units or a Cell processor, a relatively fine level of granularity may be required to make efficient use of the processing units. The level of granularity chosen may vary across the scope of a single job, and the granularity analyzer may change the granularity multiple times over the course of processing a single job, essentially breaking the job into a series of sub-jobs, each sub-job having an assigned level of granularity. After determining the appropriate level of granularity using a granularity analyzer for rendering of a particular print job using the processors present the granularity analyzer passes the print job data stream along with the granularity selections to the job partitioner.

The job partitioner divides the print job data according to the granularity selection into rasterizable work units 126. Each work unit is a portion of the print job, at the selected granularity, that can be rasterized independently of and concurrently with other work units using one of the processors present. For example, work units may consist of a page, a graphical object, a group of graphical object, or a band of scan lines.

Figure 4:
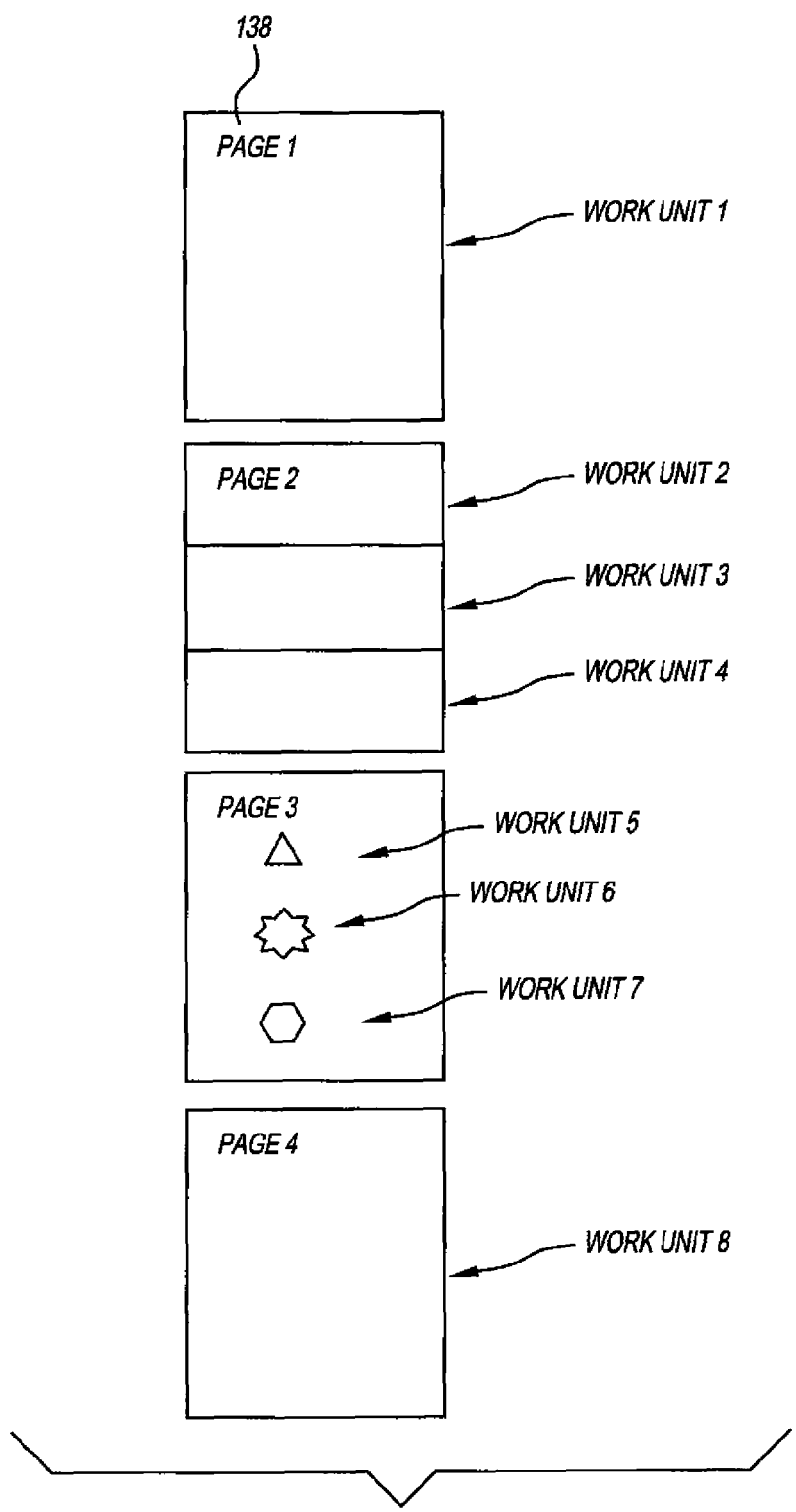
FIG. 4 shows the data flow of print job processing using multiple rendering threads in the above described adaptive print driver.

FIG. 4 shows an example job comprising four pages (Page1, 2, 3 and 4). In this example the job has been partitioned into eight work units: whole pages for pages one (work unit 1) and four (work unit 8), bands for page two (work units 2-4) and graphical objects for page three (work units 5-7), as determined by the granularity analyzer. The job partitioner ensures that work units 1-8 are independent, and may sometimes replicate certain data from a page or object description across work units in order to guarantee independence. The job partitioner will also record metadata including the page number and location 138 on the page, that are need to reassemble the work units into complete, and properly ordered page raster images once rasterization of work units is complete. After the appropriate meta-data is added, each work unit is stored in the work unit FIFO, to await rasterization by a rendering thread on one of the processors. Partitioning the print job using a the job partitioner into independent work units based on that level of granularity will allow the work units to be processed by independent threads of execution so that rendering of the work units occurs substantially in parallel 130 in one embodiment.

Since there are multiple rendering threads executing on general-purpose processors, the work unit FIFO constitutes a synchronization point between the job partitioner and rendering threads, and access to it must be mutually exclusive to prevent data corruption. Therefore, the work unit FIFO is protected using a standard synchronization construct, such as a condition variable or semaphore, as is well known to those skilled in the art of multi-threaded programming techniques.

Referring again to FIG. 3, the rendering threads perform the rasterization of the work units as they become available. In the one preferred embodiment the number of rendering threads is equal to the number of processors, so that all processors can be kept active, concurrently rendering work units. Each rendering thread will remain idle, waiting on the work unit FIFO. When a work unit appears in the FIFO, exactly one rendering thread will become active, retrieve the work unit from the FIFO and proceed to render it 132. The process of rendering a work unit may involve a number of steps such as drawing graphical objects or characters of text, performing color conversions to the device color space of the printer, halftoning the resulting raster image, compressing the final raster data, and the like.

The actual rendering steps 132 for a work unit are dependent on the level of granularity, the type of processors on which the rendering occurs and the capabilities of the printer, and are familiar to those skilled in the art. The rendering threads store completed work units to the Rendered Work Unit Store, where they await reassembly. Like the work unit FIFO, the Rendered work unit store is a synchronization point, and is therefore protected by a synchronization construct to guarantee mutually exclusive access.

Continuing with FIG. 3, the assembler 134 is responsible for reassembling completed work units into the proper order for printing. This is done using the metadata that was added to each work unit by the job partitioner. Since work units are rendered in parallel, it is likely that they will arrive in the completed work store out of order, especially with increasing numbers of processors. Thus, the assembler may at times remain idle waiting on specific work units. As the assembler gathers the necessary work units and arranges them in the correct order it writes as much of the data stream as possible to the printer. Thus, the assembler operates in a streaming mode and does not wait for the entire job to complete rendering before writing rendered data to the printer. The metadata attached to each work unit during job partitioning facilitates reassembling the work units in the correct sequence for printing after rendering and results in a correctly assembled job sequence being sent to the printer 136.

Figure 5:
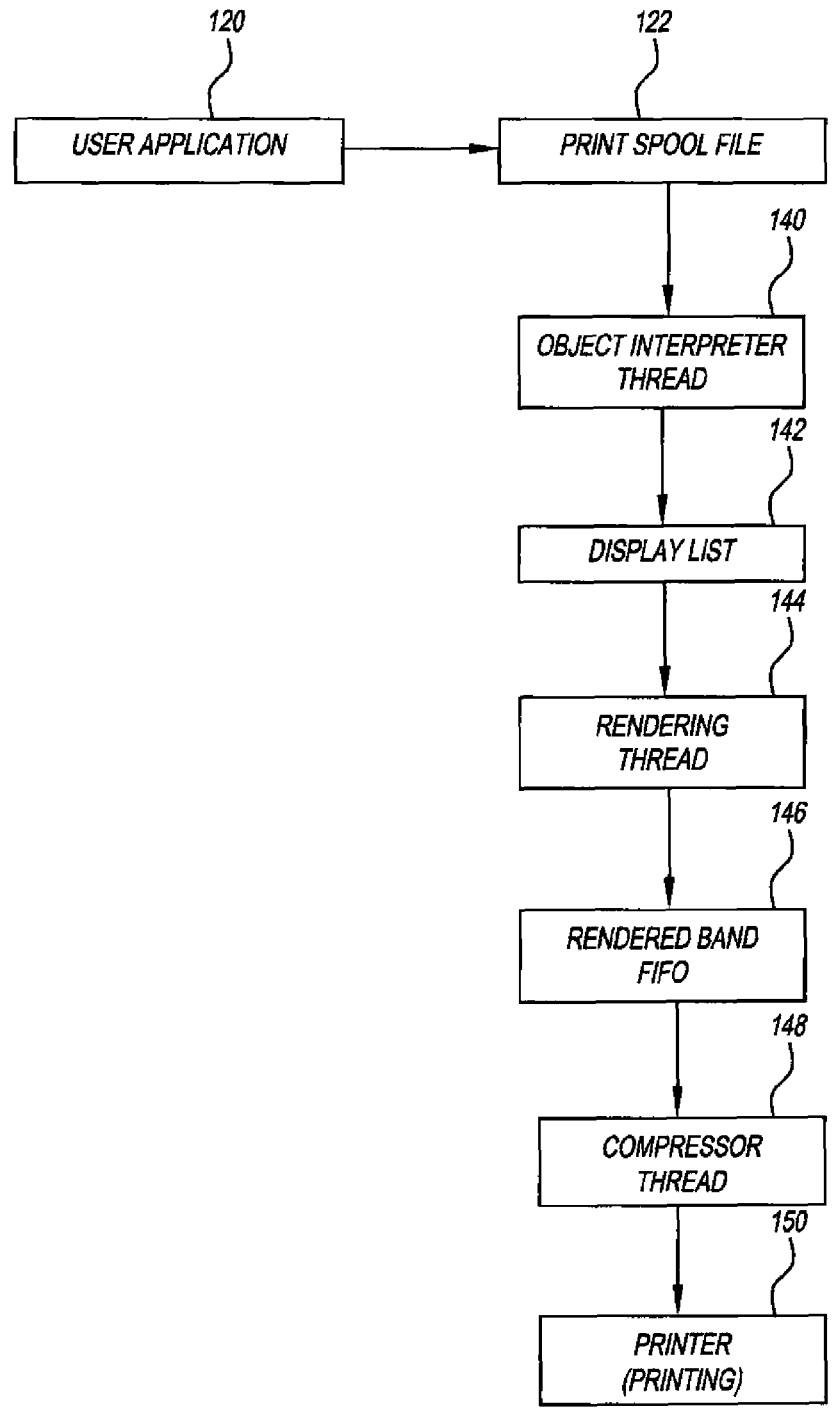
FIG. 5 shows the data flow of print job processing using independent threads for each stage of processing pipeline in another embodiment of the adaptive print driver.

An alternative embodiment of this invention, shown in FIG. 5, consists of an adaptive print driver 26 configured as a pipeline of processing steps, with each process implemented in a separate thread of execution. In this configuration the various processing steps are able to execute substantially in parallel, to the extent that hardware processors are available. The various processing threads are shown in FIG. 5, as one possible arrangement for the alternative embodiment, but other arrangements are possible as well. In this arrangement the first thread is the object interpreter thread 140, which receives high-level page descriptions from the print spool file and translates abstract object descriptions to an intermediate display list representation. A display list 142 representation may consist, for example, of low level graphics rendering primitives, sorted by the location of the graphics elements on the page, as is well known to those skilled in the art. Following translation to the display list, a rendering thread reads the display list 144 and renders the low level graphics primitives, performs color conversion and then halftoning of the raster data. The rendering thread stores band of raster data into the rendered band FIFO 146. The compression thread 148 then reads bands of raster data from the FIFO and compresses each band before sending it to the print engine 150. In this embodiment the display list store and the rendered band FIFO are both synchronization points between independent execution threads. Therefore, they are protected by appropriate synchronization constructs to guarantee mutually exclusive access, as is well known in the art.

The invention has been described in detail with particular reference to certain one preferred embodiments thereof, but it will be understood that variations and modifications can be effected within the spirit and scope of the invention. This invention is inclusive of combinations of the embodiments described herein. References to a "particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular and/or plural in referring to the "method" or "methods" and the like are not limiting.

What is claimed is:

1. A multiprocessor system having plural processor units including:
   a reception circuit for receiving a setting demand requesting one of a first mode in which each of said plural processor units operate in page level granularity and a second mode in which at least one of said plural processor units operates in a lower granularity level than the page level granularity of the first mode; and
   a setting circuit for classifying said plural processor units in the first mode into plural groups, each group containing at least one processor unit, to successively set said plural groups to the first mode in turn when said reception circuit receives a setting demand requesting the first mode, and to successively set said plural processor units to the second mode in turn when said reception circuit receives a setting demand requesting the second mode, wherein said setting circuit determines a total granularity demand of said plural processor units when said reception circuit receives the setting demand requesting one of the first mode or the second mode and collectively sets the plural processor units to a normal state or a low granularity-demand state in accordance with the requested one of the first mode or the second mode.

2. A multiprocessor system having plural processors which are classified into plural groups in advance, each one of the groups containing at least one processor, said multiprocessor system including:
   a generation circuit generating a setting demand requesting one of a first mode in which each of said plural groups is in a normal state and a second mode in which each of said plural groups is in a low granularity-demand state whose granularity is at a lower level than a granularity level in the first mode;
   a reception circuit receiving a granularity demand; and a setting circuit successively setting each of said plural groups to said normal state in turn according to said setting demand requesting said first mode being received by said reception circuit, and successively setting each of said plural groups to said low granularity-demand state according to said setting demand requesting said second mode being received by said reception circuit.

3. The multiprocessor system as claimed in claim 2, further including an input circuit inputting a signal corresponding to an instruction received from outside said multiprocessor system and an output circuit outputting said setting demand requesting said second mode when said input circuit does not input said signal requesting said first mode.

\* \* \* \* \*